Nov. 17, 1936.   G. L. HUNT   2,060,806
AIRCRAFT INTERCOMMUNICATION SYSTEM
Filed Dec. 14, 1932
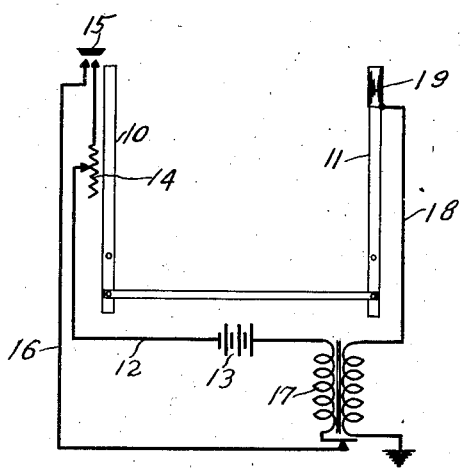
Fig. 1
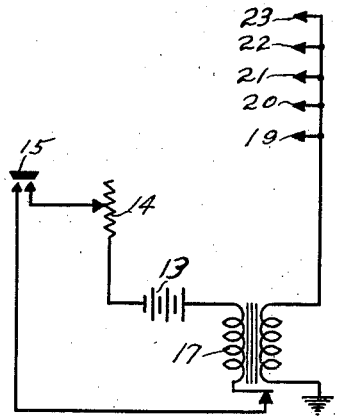
Fig. 2
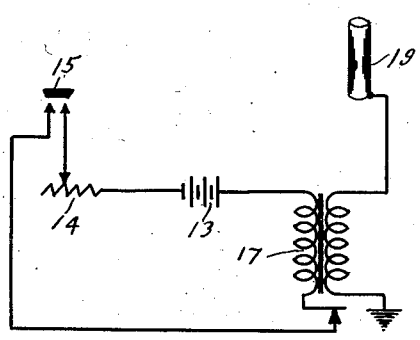
Fig. 3
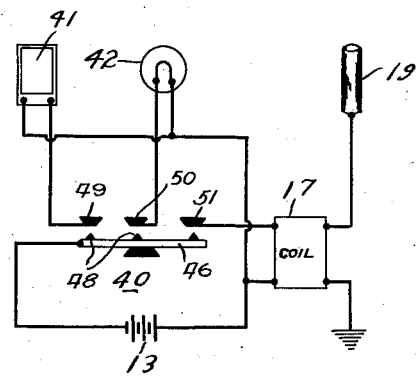
Fig. 4
Fig. 5
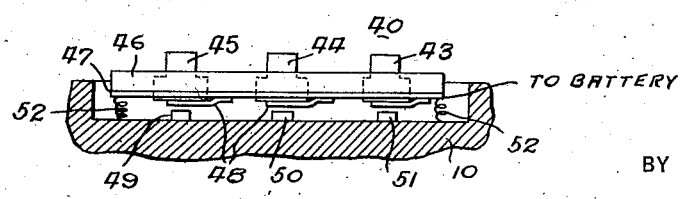
INVENTOR
BY  G. L. Hunt.
ATTORNEY Patented Nov. 17, 1936

2,060,806

UNITED STATES PATENT OFFICE 2,060,806

AIRCRAFT INTERCOMMUNICATION SYSTEM

Gurney L. Hunt, Washington, D. C.; Mabel Graybill Hunt executrix of said Gurney L. Hunt, deceased Application December 14, 1932, Serial No. 647,238

4 Claims. (Cl. 177—339)

(Granted under the act of March 3, 1883, as amended April 30, 1928; 370 O. G. 757)

My invention relates to a system of intercommunication particularly applicable to communicating between a plurality of stations in an aircraft, especially of the dual control and training types in which more than one member of the crew have access to the control mechanisms.

An object of my invention is to provide a positive means of intercommunication between the members of the crew of an aircraft that is practical, simple, economical, reliable, instinctively recognized and responded to through the sense of touch, supplemented by those of sight and hearing, as desired.

Another object of this invention is to provide an intercommunication system in association with aircraft control mechanisms whereby the instantaneous transfer of intelligence from one station to another is possible without detracting an operator's attention from his duties in connection with the control of said aircraft but, instead, assisting him in the performance of those duties.

A further object of my invention is the promoting of safety, especially in connection with aircraft operating instructions given to students and in the guidance of inexperienced, hence non-reliable, operators.

The above and other objects, which will appear as the description of my invention is developed, are attained through the construction, combination and arrangement of certain electrical equipment as hereinafter fully described and illustrated in the accompanying drawing.

Referring to the drawing:

Fig. 1 shows the application of my invention to the dual control sticks of an aircraft;

Fig. 2 represents the system applied to a plurality of stations;

Fig. 3 is a schematic wiring diagram of the circuit used in Fig. 1;

Fig. 4 illustrates the system where sight or hearing may be substituted or combined simultaneously with touch for activating responses at a second or plurality of stations;

Fig. 5 is a side view in detail of the switch 40 in Fig. 4.

It is known that systems of intercommunication have been employed between stations of aircraft including prearranged meanings of arm motions, exchange of written messages between operators, and interphone communication systems. These, however, are inherently susceptible to misunderstanding, delay and interference due to the locations of such stations in aircraft and external noises of considerable volume. Furthermore, the interpretation of such messages requires a degree of concentration on the part of an operator which detracts his attention from or interferes with the duties he must perform. A misunderstanding of any message thus conveyed may endanger life and property. A novice may become confused, lose his nerve and attempt to do the wrong thing regardless of information given him by the methods heretofore employed.

The lives of pilots and students are frequently endangered by students freezing to the duplicate hand control stick, thus making it impossible for the pilot to properly manipulate the control at his station. At a critical moment, this freezing to the control is liable to cause serious consequences. Even when equipped with telephone head sets, commands given by the pilot are either misunderstood or fail to register in moments of intense concentration or imminent danger. Mechanical devices for disconnecting the duplicate control while in the air have been tried out and found unsatisfactory due to their complicated design and unreliability. Furthermore, these devices must be manually operated by the pilot which, when time is a vital consideration, makes them of little or no value. Therefore, in the absence of any method or device that can be relied upon to instantly cause a student to release a frozen control, pilots have been compelled at times to resort to physical means not only painful, but sometimes humiliating, particularly if a woman student is involved.

In order to overcome these deficiencies, the method and means provided by my invention have been developed so that instinctive subconscious response of one operator to the will and desires of another is assured and made positive by the employment of apparatus embodying the principles set forth herein.

Referring to the accompanying drawing, in the arrangement shown in Fig. 1, 10 and 11 are the dual controls of an aircraft, 10 being the master control and 11 the auxiliary or student control. A wire 12 leads from the battery 13 through a rheostat 14 to pushbutton 15 located on control stick 10. The pushbutton 15 can be operated instantly without interfering with any movements of controls 10 or 11. Another wire 16 leads from the pushbutton 15 through the interrupter and primary of an induction coil 17 to the other terminal of battery 13. One end of the secondary of coil 17 is connected by wire 18 to the metal plate 19 on the end of control stick 11. The other end of the secondary of coil 17 is connected to ground which may be the fuselage of the aircraft.

The operator on control 10, by contacting the pushbutton 15 and adjusting the rheostat 14, can transmit to the touch of the assistant or student operator at control 11, signals or shocks of varying intensity and duration subject to the capacity of the current used. By this means, the pilot can indicate the improper manipulation of the other control by means of transmitting to the operator in error an electrical shock of sufficient intensity to apprise him of his error. By the use of prearranged signals, the student can also be informed as to the corrective measures to be taken. By increasing the intensity of the current through rheostat 14, a greater shock is transmitted to the student indicating that the latter is to release the control. Where the irritation caused by the increased current is sufficiently strong, the student will instinctively release his hold on the control, especially if inclined through fright to freeze thereto.

The extension of the above system to a plurality of stations or controls is shown in Fig. 2 where, with similar parts numbered as before, 19, 20, 21, 22 and 23 represent connections to the other stations or controls, it being understood that such connections terminate in metal plates, bells, buzzers or lights so as to command an operator's attention at these stations through the senses of touch, hearing or sight. The shock received by touching one of the energized controls will tend to prevent its operation. Error in manipulation of the desired control may be indicated as before by cutting that control in on the circuit.

The schematic wiring diagram of the circuit used in Fig. 1 is shown in Fig. 3. This diagram is self-explanatory in view of the foregoing disclosure.

The use of audible and visible indications in addition to tactile is shown in Fig. 4, where 40 is a three-contact switch taking the place of pushbutton 15, 41 is a bell or buzzer, 42 a light, and other reference characters indicate similar parts as before. Switch 40 may be operated to supply current to either the bell, light, or metal plate individually; or to supply current to them all simultaneously. Switch 40, which may be mounted in control member 10, comprises push buttons 43, 44, 45, mounted in bar 46, which has fixed to it a strip 47 of conducting material connected to battery 13, the bar being normally urged outwardly by springs 52. Secured to strip 47 are spring contact members 48 that are, respectively, movable by the push buttons to close supports individually through contacts 49, 50 and 51 to bell 41, light 42, on shocker plate 19. When it is desired to actuate all three signals simultaneously bar 46 is pushed in as a unit, against the resistance of springs 52 to close supports through all of the contacts 49, 50, 51. Devices 19, 41 and 42 may be present at the same station or at separate stations. In this manner, the senses of sight and hearing may be utilized for purposes as hereinbefore described instead of that of touch in situations when the latter might not be feasible or desirable, or may supplement the latter to render a warning more apparent.

It will be understod that the above description and accompanying drawing comprehend only the general and preferred embodiments of my invention and that various changes in the construction, proportion and arrangement of parts may be made within the scope of the appended claims without sacrificing any of the advantages of this invention.

The herein described invention may be manufactured and used by or for the Government of the United States of America for governmental purposes without the payment of any royalty thereon.

What I claim as new and desire to secure by Letters Patent of the United States is:

1. In a safety apparatus for dual control aircraft having a master control stick for operation by a master pilot and an auxiliary control stick for operation by an auxiliary pilot and interconnected with said master control stick for movement in unison therewith, the combination of a primary low tension direct current circuit including a circuit interrupting device and a manually operable switch mounted on said master control stick within convenient access to the master pilot; and a secondary high tension electric circuit electrically coupled with said low tension primary circuit and including an electrode mounted on said auxiliary control stick for engagement with the hand of the auxiliary pilot, said secondary high tension circuit being adapted, when said switch on the master control stick is closed, to deliver an electric shock through said electrode of sufficient intensity to cause the auxiliary pilot to release through subconscious muscular reaction said auxiliary control stick.

2. In a safety apparatus for dual control aircraft having a master control stick for operation by a master pilot and an auxiliary control stick for operation by an auxiliary pilot and interconnected with said master control stick for movement in unison therewith, the combination of a primary low tension electric circuit including a manually operable switch mounted within convenient access to the master pilot; and a secondary high tension electric circuit electrically coupled with said low tension primary circuit and including an electrode mounted on said auxiliary control stick for engagement with the hand of the auxiliary pilot, said secondary high tension circuit being adapted, when said switch is closed, to deliver an electric shock through said electrode of sufficient intensity to cause the auxiliary pilot to release through subconscious muscular reaction said auxiliary control stick.

3. In a safety apparatus for aircraft having interconnected dual control elements separately operated by a master pilot and an auxiliary pilot, the combination of a master control element; a primary low tension direct current electric circuit consisting of a source of electromotive force, a circuit interrupting device, a primary of an induction coil, a rheostat, and a switch member mounted on and insulated from the said master control element; an auxiliary control element interconnected with the said master control element for movement in unison therewith; a secondary high tension electric circuit consisting of the secondary of said induction coil, an electrode mounted on and insulated from the auxiliary control element, the body of the auxiliary pilot, and the fuselage; whereby high tension electrical impulses are capable of being transmitted through said electrode of sufficient intensity to cause the auxiliary pilot to release through subconscious muscular reaction said auxiliary control element.

4. In a safety apparatus for aircraft having interconnected dual control elements separately operated by a master pilot and an auxiliary pilot, the combination of a master control element; a primary low tension electric circuit consisting of a source of electromotive force, a primary of an induction coil, a rheostat, and a switch member mounted within convenient access to the master pilot; an auxiliary control element interconnected with the said master control element for movement in unison therewith; a secondary high tension electric circuit consisting of the secondary of said induction coil, an electrode mounted on and insulated from the auxiliary control element, the body of the auxiliary pilot, and the fuselage; whereby high tension electrical impulses are capable of being transmitted through said electrode of sufficient intensity to cause the auxiliary pilot to release through subconscious muscular reaction said auxiliary control element.

GURNEY L. HUNT.